(12) United States Patent
Oshima et al.

(10) Patent No.: US 6,766,110 B1
(45) Date of Patent: Jul. 20, 2004

(54) JUMPING ZOOM LENS FOR DIGITAL STILL CAMERAS

(75) Inventors: Shigeru Oshima, Tokyo (JP); Yoshio Yamazaki, Kanagawa (JP)

(73) Assignee: Arc Design, Inc., Tokyo (JP)

( * ) Notice: Subject to any disclaimer, the term of this patent is extended or adjusted under 35 U.S.C. 154(b) by 0 days.

(21) Appl. No.: 10/357,875

(22) Filed: Feb. 4, 2003

(51) Int. Cl.[7] .............................. G03B 5/00; G02B 15/14
(52) U.S. Cl. ........................ 396/72; 396/85; 348/240.3; 359/676; 359/696
(58) Field of Search .............................. 396/72, 85–87; 348/240.3; 359/676, 696, 697

(56) References Cited

U.S. PATENT DOCUMENTS

| | | | | |
|---|---|---|---|---|
| 4,864,337 A | * | 9/1989 | Himuro et al. | 396/72 |
| 5,241,335 A | * | 8/1993 | McIntyre | 396/86 |
| 5,612,737 A | * | 3/1997 | Nagano | 348/240.3 |
| 6,031,998 A | * | 2/2000 | Shono | 396/75 |
| 6,434,331 B1 | * | 8/2002 | Araoka et al. | 396/72 |

* cited by examiner

Primary Examiner—W. B. Perkey
(74) Attorney, Agent, or Firm—Senninger, Powers, Leavitt & Roedel

(57) ABSTRACT

A multifocal lens to be used for digital still cameras comprises a fixed first lens or a first group of lenses; a movable second lens or a second group of lenses; and a fixed third lens or a third group of lenses, wherein the second lens or second group of lenses moves back and forth (up and down) between the first and third lenses or lens groups, and changes its own focal length of the whole lens from wide angle to telephoto and vice versa.

2 Claims, 6 Drawing Sheets

Fig. 2
(PRIOR ART)
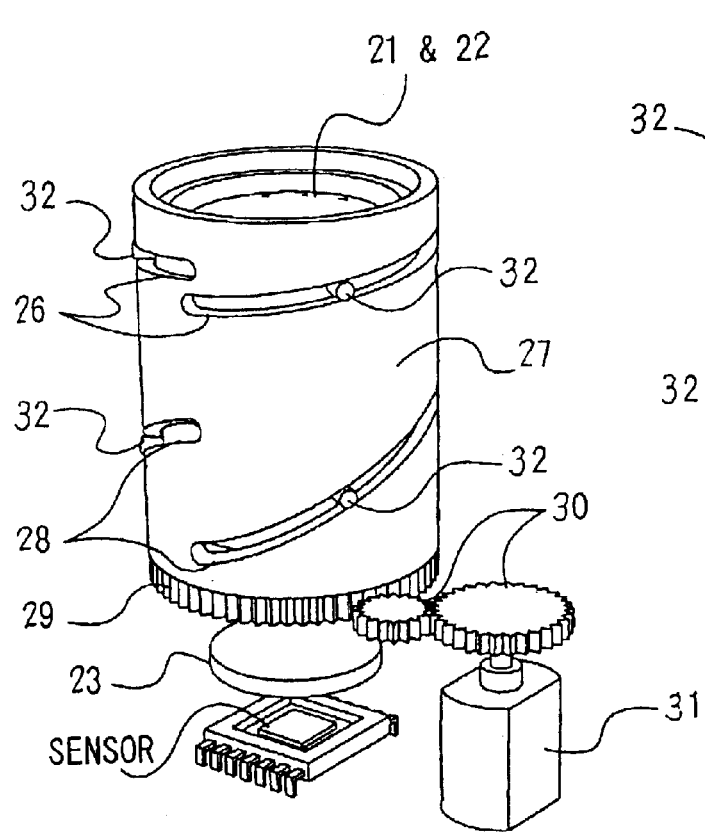
Fig. 2-a
(PRIOR ART)
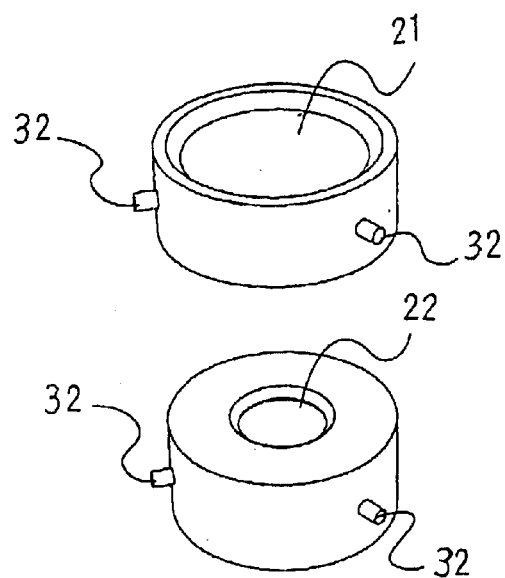

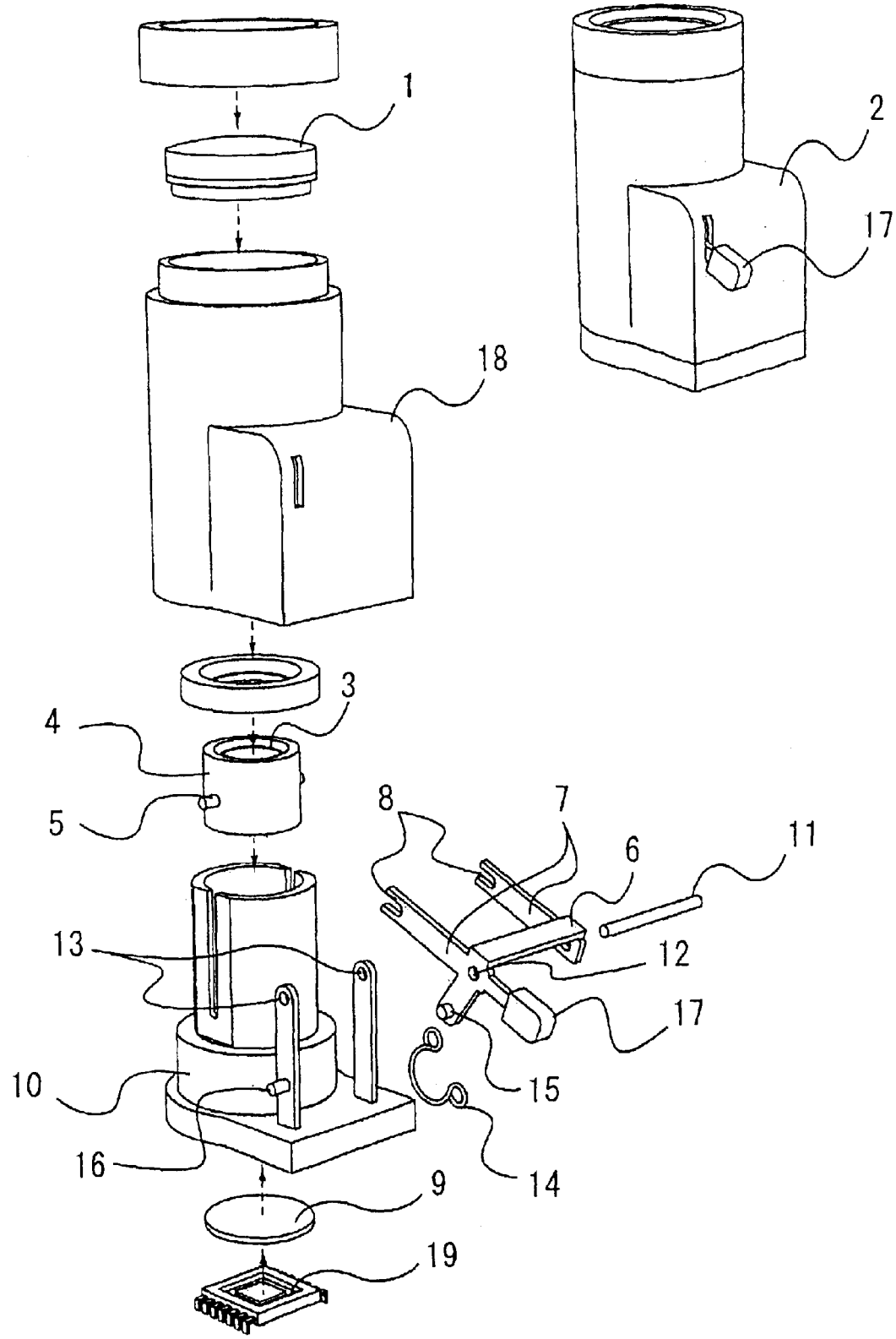

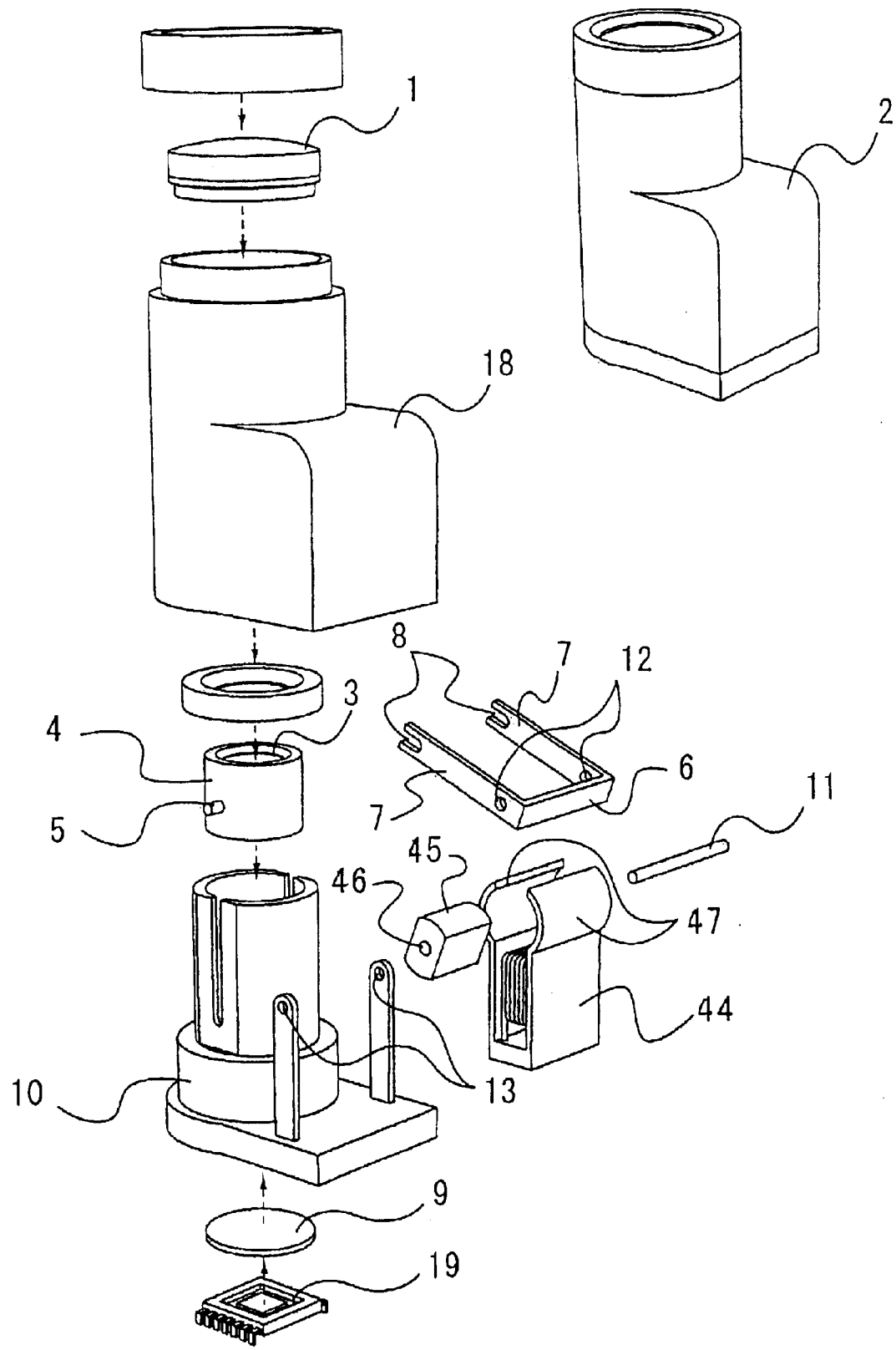

JUMPING ZOOM LENS FOR DIGITAL STILL CAMERAS

BACKGROUND OF THE INVENTION

1. Field of the Invention

The invention relates to a multifocal lens for digital still cameras (hereinafter referred to as DSC), of which focal length can be changed from wide angle to telephoto and vice versa with the back and forth (up and down) movements of the second lens or lens group between the first and third lenses or lens groups.

2. Background Art

In DSCs, a zoom lens is usually used to obtain multiple focal lengths, and in most cases has three lens groups, namely the first lens group, the second lens group, and the third lens group. The first and second lens groups move simultaneously while the third lens group is fixed not to move.

The movements of the first and second groups of the lenses change the focal length in straight succession working like a zoom lens. From wide angle (shortest focal length of the lens) to telephoto (longest focal length of the lens), the two groups of the lenses must be moved correspondingly with each other. From one focal length position to another, the moving strokes of two groups of lenses are determined by the design of the lens. Usually, the moving strokes of these two groups of the lenses are controlled by cams mechanically, which are groove cams in most cases.

FIG. 1 shows a typical design of zoom lens with 2× (two times) zooming ratio for DSCs. The first group of lenses (21) and the second group of lenses (22) move back and forth according to the change of the focal length and the third group of lenses (23) is fixed at the rearmost position and does not move, and the lines (24, 25) show the movements (tracks) of these two groups. The straight line (24) shows the movement (track) of the second group of lenses (22), and the curved line (5) shows the movement (track) of the first group of lenses (21). Each group moves at a time correspondingly with each other following the predetermined tracks from one focal length point to another. In FIG. 1, five focal length points are shown as examples of zooming positions. The position #1 shows the positions of the two groups of lenses at the longest focal length of telephoto position, #2 at the second- longest focal length position, #3 at the midpoint focal length position, #4 at the second- shortest focal length position, and #5 at the shortest focal length of wide angle position.

To enable the two groups of lenses to carry out the correspondent movements effectively, a mechanism with groove cams is usually used. FIG. 2 and FIG. 2-a show the conventional and mechanical controlling system of zoom lens, which has six groove cams. One group of the lenses is controlled by three groove cams of same curve and dimensions as a set provided on the periphery of the outermost lens barrel (a tube to hold the whole lens assembly), and another set of three groove cams of same curve and dimensions provided on the same periphery of the lens barrel controls the other group of the lenses.

The first set of the groove cams (26) provided on the outermost lens barrel (27) controls the first group of the lenses (21), and the second set of the groove cams (28) provided on the outermost lens barrel (27) controls the second group of the lenses (22). At the bottom rim of the outermost lens barrel (27), the gear teeth (29) are provided, and are engaged with the driving gears (30) of the stepping motor (31). When the zooming switch is turned on, the stepping motor (31) starts rotating, and then the outermost lens barrel (27) starts rotating. While the outermost lens barrel (27) rotates, the groove cams (26, 28) move, too, and the two groups of the lenses (21, 22) also move back and forth (up and down) by the movements of the pins (32) fixed on the lens barrel of each lens group and inserted into the slots of the groove cams, which move according to the curves of the groove cams (26, 28). The curves of the groove cams (26, 28) are designed according to the design data of the zoom lens accurately, namely according to the tracks like the tracks (24, 25) shown in FIG. 1. The direction of lens movement (back or forth) is determined by the direction of stepping motor rotation.

In this type of mechanical controlling of zooming, a high degree of accuracy of the groove cams is required and it is very difficult to manufacture lens barrels with such accurate groove cams, and consequently the cost of such accurate parts and components is quite expensive. The assembling and adjustment of the lens with such controlling mechanism are also quite difficult.

As explained so far, to fix the zoom lens at each focal length position accurately through zooming, the first and second groups of lenses must be operated quite accurately at a time correspondingly with each other, and the operation of a zoom lens like this mechanism must be very complicated and expensive.

On the other hand, users practically tend to jump from wide to telephoto or vice versa while skipping all the midpoints. Unless the difference of focal length between wide and telephoto is fairly big, it is difficult for the users to find any image effects of interests at the midpoints. This fact means that many of the users of DSC with zoom function do not fully use the expensive and complicated mechanism of zooming actually and practically, and simply use the shortest focal length position of wide angle and the longest focal length position of telephoto only.

To use the zoom lens only at its shortest or longest focal length positions, the expensive and complicated conventional groove cam mechanism can be omitted, and it is possible to have a much simpler mechanism with less and more inexpensive parts and components, and much easier way of assembling.

OBJECTS OF THE INVENTION

It is therefore an object of this invention to provide a zoom lens for a DSC in which the focal length can be instantly changed from the shortest length to the longest length and vice versa while skipping all the midpoint focal lengths.

It is another object of this invention to provide a zoom lens for a DSC eliminating the expensive groove cam zooming control, in which two groups of lenses move simultaneously.

SUMMERY OF THE INVENTION

As shown in FIG. 1, the track of the first group of lenses is curved very slightly, but the movement is relatively very small. Especially, the position difference of the first group of lenses between the telephoto position (the longest focal length, position #1) and the wide angle position (the shortest focal length, position #5) is extremely small, and the difference between the shortest and longest focal lengths of the first group of lenses could be considered non-existing. If users skip all the midpoint focal lengths where the first group of lenses moves rather largely back and forth (up and down) to change the focal lengths and to have the shortest or longest focal length position, it will be not necessary to move the first group of lenses at all.

Now to avoid the so far mentioned complicated two lens group controlling, by skipping the midpoint focal length positions, the first group of lenses can be fixed at a position, namely at the wide angle or at the telephoto position, because they are very close to each other and practically the same. Thus, by fixing the first group of lenses at the position, the groove cams for the first group of lenses can be omitted.

The second group of lenses moves linearly between the wide angle and telephoto positions. Its movement is quite straight and simple, yet to have this kind of lens movement, we need the groove cams. However, if the zooming jumps from wide to telephoto or from telephoto to wide without stopping at any of midpoint focal lengths, the groove cams for the second group of lenses can be also omitted, because it is not necessary to follow the zooming data of lens design to obtain the accurate position of each midpoint focal length.

In this invention the first group of lenses is fixed at the wide angle (or telephoto) position, and the first groove cams arc omitted, and then the mechanism moves the second group of lenses instantly from wide to telephoto without stopping at any midpoint focal lengths, and vice versa, so the second group cams are also omitted.

In the case of conventional film cameras (analogue cameras like 35 mm format film cameras), even though the optical designs of zoom lenses are similar to those of DSCs, their lenses are much bigger in size and heavier in weight in comparison with the DSCs, and it is quite difficult or practically impossible to use this direct jumping zoom method. Because the speed of movement of the second group of lenses cannot be so high due to its heavy weight and also long stroke of the second group of lenses movement, and while users are switching the focal length from telephoto to wide or vice versa, the image will be out of focus or soft in focus for a period of time, which is unacceptable to the users. However, in the case of the DSC, the second group of lenses can be moved quite instantly thanks to its very small size and light weight, and the soft images or images out of focus during jumping from wide to telephoto or from telephoto to wide can be practically negligible for the users, because such images appear only in a mere instant.

By moving only the second group of lenses between the two positions, the focal length can be changed from the wide angle to the telephoto or vice versa. The second group of lenses simply can jump up to the telephoto position or jump back to the wide-angle position, neglecting all the delicate positions of midpoint.

Thus, by fixing the first group of lenses at a position and by using a simple mechanism to move the second group of lenses jumping from the wide-angle position to the telephoto position or vice verse without stopping at any of midpoint focal length positions, the expensive and complicated mechanism with groove cams can be omitted from the zoom lens for the DSC, and the cost can be tremendously saved and the assembling of the zoom lens can be also far much easier than that of conventional groove cam zooming system.

BRIEF DESCRIPTION OF DRAWINGS

FIG. 2 is a perspective view of the conventional zooming control system by groove cams;

FIG. 2-a is a perspective view of the two groups of lenses assembled in each lens barrel, which are placed in the conventional zooming control system with cams shown in FIG. 2;

FIG. 3 is a perspective view of a first preferred embodiment of the jumping zoom lens assembly for digital still cameras;

FIG. 4 is an exploded perspective view of the first preferred embodiment of the jumping zoom lens for digital still cameras of this invention;

FIG. 7 is a perspective view of a second preferred embodiment of the jumping zoom lens assembly for digital still cameras;

FIG. 8 is an exploded perspective view of the second preferred embodiment of the jumping zoom lens for digital still cameras of this invention;

DETAILED DESCRIPTION OF THE INVENTION

Figure 1:
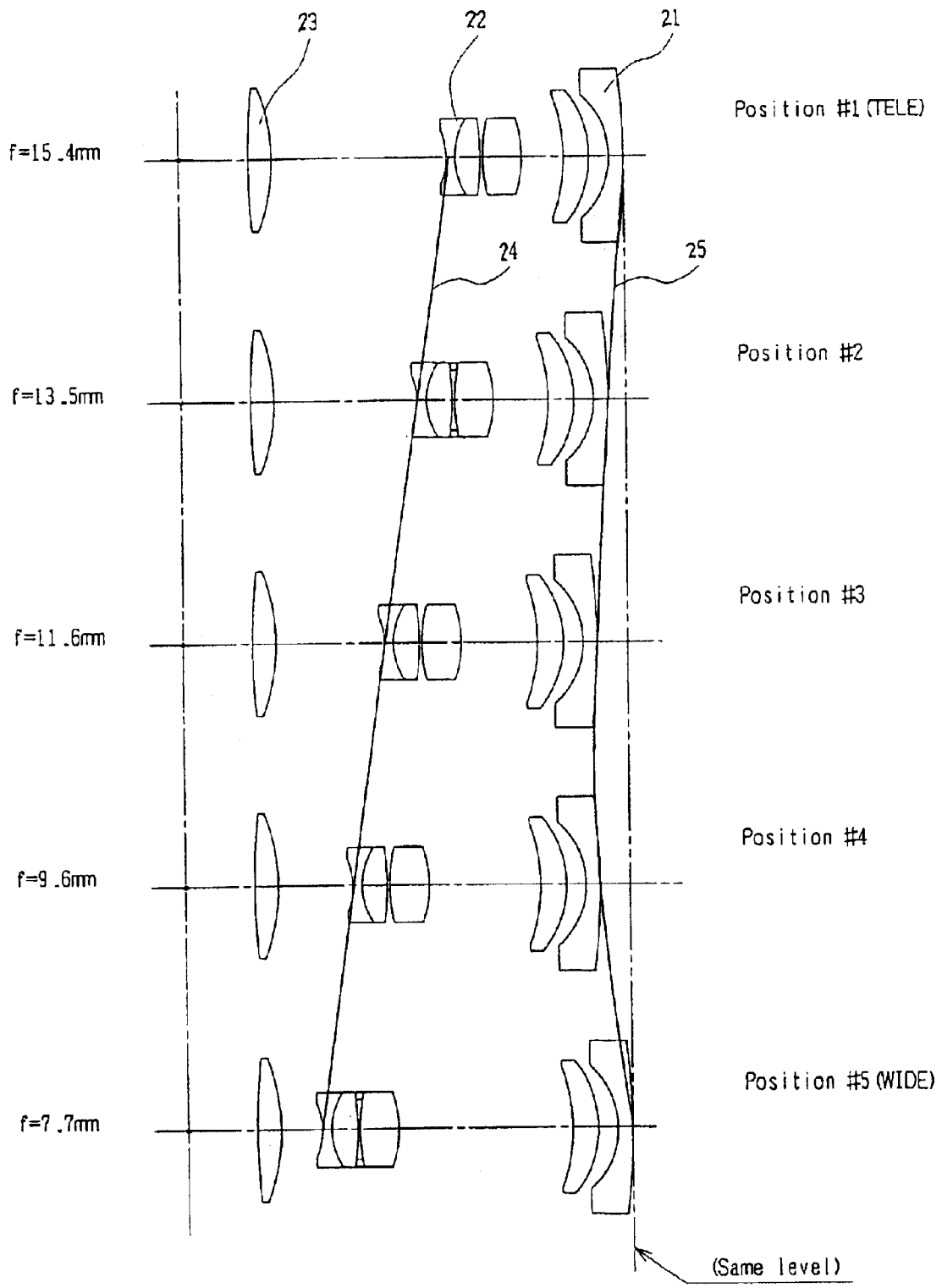
FIG. 1 is a drawing of typical design of a zoom lens for digital still cameras, which shows the moving tracks of the first and the second groups of lenses.
Figure 5:
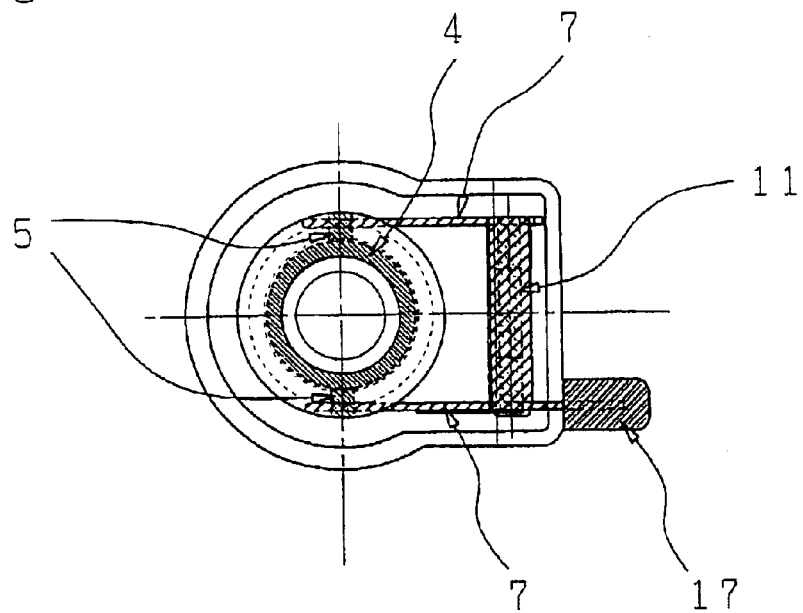
FIG. 5 is a cross-sectional view of the first preferred embodiment of the jumping zoom lens for digital still cameras of this invention.

FIGS. 3 to 6 show a first preferred embodiment of this invention, namely the jumping zoom lens for DSCs which is operated manually with spring tension and comprises a group of lenses (hereinafter referred to as the first lens (1)), fixed at the headmost position of the zoom lens assembly (2); another group of lenses (hereinafter referred to as the second lens (3)) which is assembled in a lens barrel (hereinafter referred to as the second lens barrel (4)) with two projected bosses as axles (hereinafter referred to as the axle bosses (5)) on the periphery of the second lens barrel (4) and placed next to the first lens (1); a lens holding lever (6) with two holding arms (7) which have forked slots (8) inserting into the two axle bosses (5) of the second lens barrel (4); another group of lenses (hereinafter referred to as the third lens (9)) which is assembled at the rearmost position of the zoom lens assembly (2) and fixed on an assembly base (10); a lever axle (11) placed through bearing holes (12) provided on the lens holding lever (6), both ends of the lever axle (11) being kept in lever axle bearings (13) provided as a part of the assembly base (10); an omega spring (14) being held between an omega spring boss A (15) provided on the lens holding lever (6) and an omega spring boss B (16) provided as a part of the assembly base (10); a knob of telephoto-wide switching (hereinafter referred to as the T-W knob (17)), which is provided as an extension of the lens holding lever (6) at the opposite end of the lens holding lever (6) from the forked slots (8) of the holding arms (7); and a main housing (18). All these component parts are assembled on the assembly base (10) on which an image sensor (hereinafter referred to as the sensor (I 9)) like CCD or C-MOS is also placed just underneath of the third lens (9), and the whole assembly is covered by the main housing (18).

Figure 6:
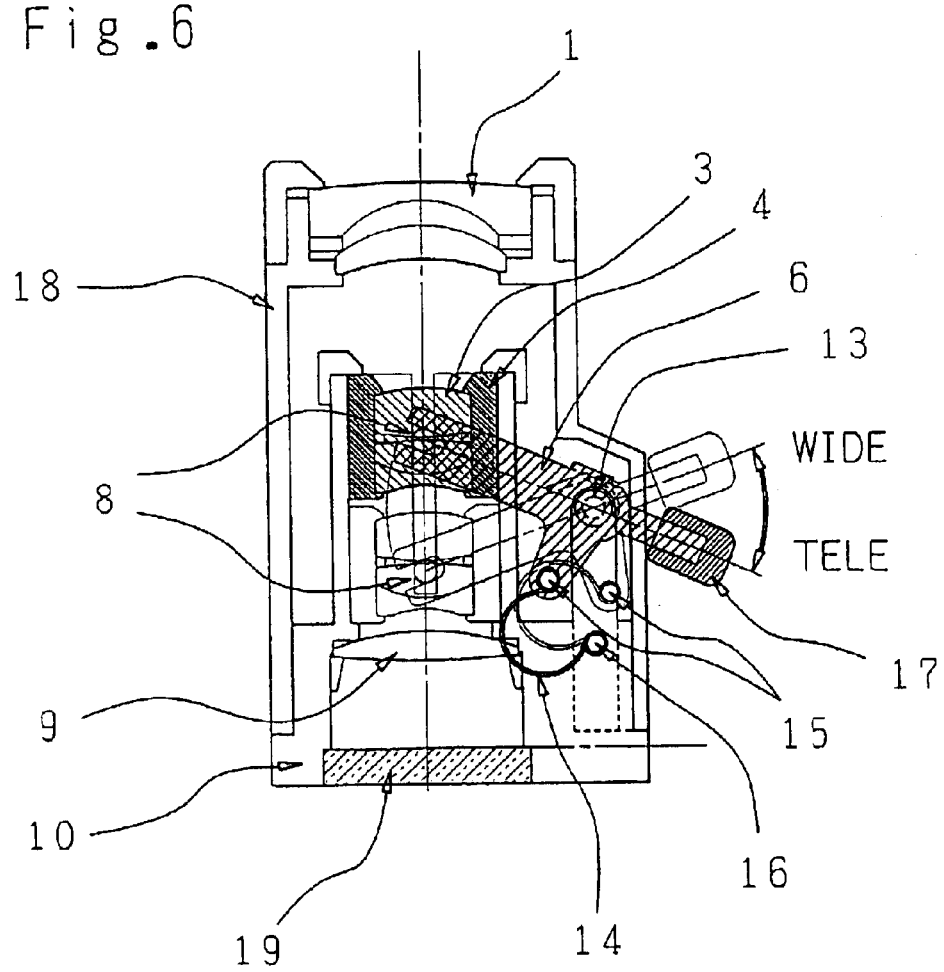
FIG. 6 is a longitudinal sectional view of the first preferred embodiment of the jumping zoom lens for digital still cameras of this invention.
Figure 9:
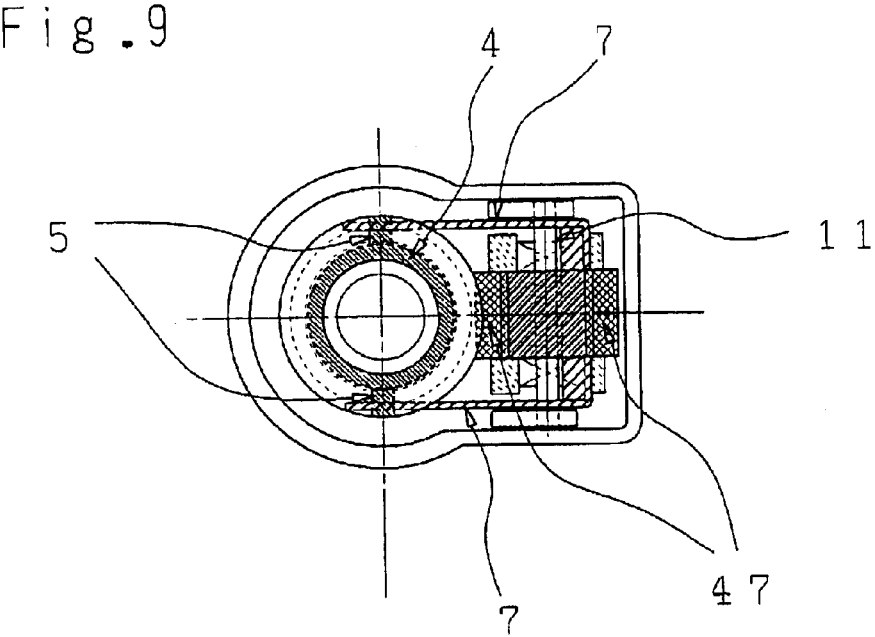
FIG. 9 is a cross-sectional view of the second preferred embodiment of the jumping zoom lens for digital still cameras of this invention.

The first lens (1) is fixed at the headmost position (top) of the zoom lens assembly (2), and does not move. Next to the first lens (1), the second lens (3) is placed, and is assembled in the second lens barrel (4), and the second lens barrel (4) has the two axle bosses (5), which are inserted into the forked slots (8) provided at the tip of the holding arm (7) of the lens holding lever (6). The lens holding lever (6) rotates around the lever axle (I1), and along with the rotation of the lens holding lever (6) the forked slots (8) moves up and down, and at the same time the second lens barrel (4) also moves up and down. At one end of the lens holding lever (6), the T-W knob (17) is provided just like an extension of the lens holding lever (6). By pushing down the T-W knob (17) in the direction of the arrow to the mark TELE as shown in FIG. 6, the lens holding lever (6) rotates upward and the second lens (3) also moves up. If the second lens (3) comes to the top position, the whole lens is set at its telephoto position, and works as a telephoto lens. By pushing the T-W knob (17) up in the direction of the arrow to the mark WIDE as shown in FIG. 6, the lens holding lever (6) rotates downward and the second lens (3) also moves down. If the second lens (3) comes down to the low-end position, the whole lens is set at its wide-angle position, and works as a wide-angle lens. The omega spring (14) is loaded between the omega spring bosses A and B (15, 16), and the spring tension of the omega spring (14) helps the second lens (3) move quickly up and down, and also prevents the second lens (3) from stopping at midpoint focal length positions, and lets the second lens (3) move instantly and directly to the telephoto-position or the wide-angle position.

As theretofore explained, in this invention, by fixing the first lens (1) at the headmost position and the third lens (9) at the rearmost position of the zoom lens assembly (2), and by getting the second lens (3) move properly and instantly between the first and third lens having help of the omega spring (14), both the wide-angle position and telephoto position can be switched quite momentarily from telephoto to wide or from wide to telephoto without any unpleasant images of soft focus or out of focus while image travels between the wide-angle and telephoto positions. And in this invention, the conventional groove cams for zooming control that require very high accuracy to manufacture are not used, but instead only the simple mechanism of the second lens operation is used, and as the result the whole zoom lens mechanism of this invention is much simpler, less expensive and easier to assemble than that of the conventional zoom lenses for DSCs.

FIGS. 7 to 10 show a second preferred embodiment of this invention, namely the jumping zoom lens for DSCs which is operated with automatic switching using a kind of electric motor and comprises a group of lenses (hereinafter referred to as the first lens(1)), fixed at the headmost position of the zoom lens assembly (2); another group of lenses (hereinafter referred to as the second lens(3)) which is assembled in a lens barrel (hereinafter referred to as the second lens barrel (4)) with two projected bosses as axles (hereinafter referred to as the axle bosses(5)) on the periphery of the second lens barrel (4) and placed next to the first lens (1); a lens holding lever (6) with two holding arms (7) which have forked slots (8) inserting into the two axle bosses (5) of the second lens barrel (4); another group of lenses (hereinafter referred to as the third lens (9)) which is assembled at the rearmost position of the zoom lens assembly (2) and fixed on an assembly base (10); a shutter meter (44), which is a kind of electric motor, of which a magnet rotor (45) turns with an angle of about 60 degrees from one side to the other side and vice versa by switching the electric current direction; a lever axle (11) placed through bearing holes (12) provided on the lens holding lever (6) and also through the center hole (46) of the magnet rotor (45) and fixed to the lens holding lever (6) together with the magnet rotor (45), and both ends of the lever axle (11) being kept in the lever axle bearings (13) provided as a part of the assembly base (10) keeping the magnet rotor (45) just between and in the center of two solenoid arms (47) of the shutter meter (44); and a main housing (18). All these component parts are assembled on the assembly base (10) on which an image sensor (hereinafter referred to as the sensor (19)) like CCD or C-MOS is also placed just underneath of the third lens (9), and the whole assembly is covered by the main housing (18).

The first lens (1) is fixed at the headmost position (top) of the zoom lens assembly (2), and does not move. Next to the first lens (1), the second lens (3) is placed, and is assembled in the second lens barrel (4), and the second lens barrel (4) has the two axle bosses (5), which are inserted into the forked slots (8) provided at the tip of the holding arm (7) of the lens holding lever (6). The lens holding lever (6) rotates around the lever axle (11) together with the magnet rotor (45), and along with the rotation of the lens holding lever (6) the forked slots (8) moves up and down, and at the same time the second lens barrel (4) also moves up and down.

When the shutter meter (44) is powered and activated by electricity, the magnet rotor (45) turns in one direction depending on the electric current direction by about 60 degrees between the two solenoid arms (47) of the shutter meter (44), and by the rotation of the magnet rotor (45) the lens holding lever (6) simultaneously rotates upward or downward depending on the electric current direction.

Figure 10:
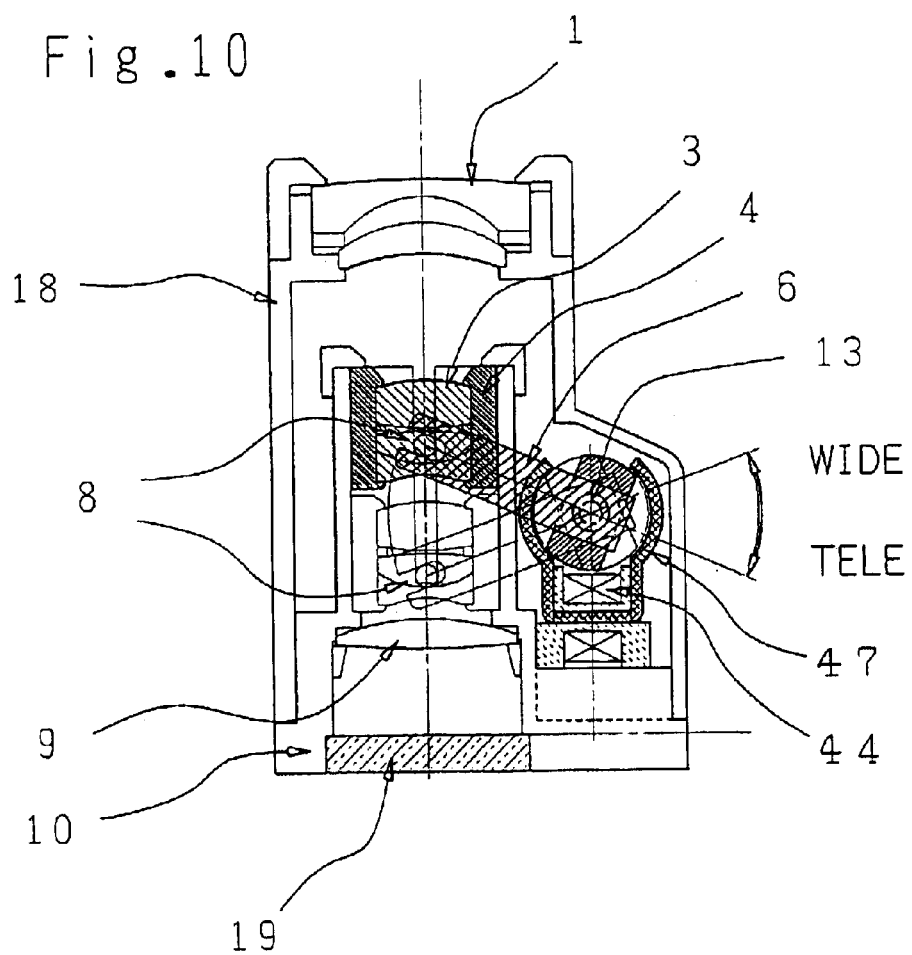
FIG. 10 is a longitudinal sectional view of the second preferred embodiment of the jumping zoom lens for digital still cameras of this invention.

By letting the magnet rotor (45) rotate in the direction of the arrow to the mark TELE as shown in FIG. 10, the lens holding lever (6) rotates upward and the second lens (3) also moves up. If the second lens (3) comes to the top position, the whole lens is set at its telephoto position, and works as a telephoto lens. By letting the magnet rotor (45) rotate in the direction of the arrow to the mark WIDE as shown in FIG. 10, the lens holding lever (6) rotates downward and the second lens (3) also moves down. If the second lens (3) comes down to the low-end position, the whole lens is set at its wide-angle position, and works as a wide-angle lens. The moving direction of the shutter meter (44) can be changed simply and instantly by changing electric current direction (plus and minus), and the quick switching of the position of the magnet rotor (45) helps the second lens (3) move quickly up and down, and also prevents the second lens (3) from stopping at midpoint focal length positions, and lets the second lens (3) move instantly and directly to the telephoto-position or the wide-angle position.

As theretofore explained, in this invention, by fixing the first lens (1) at the headmost position and the third lens (9) at the rearmost position of the zoom lens assembly (2), and by letting the second lens (3) move properly and instantly between the first and third lens having help of the shutter meter (44), both the wide-angle position or telephoto position can be switched quite momentarily from telephoto to wide or from wide to telephoto without any unpleasant images of soft focus or out of focus while image travels between the wide-angle and telephoto positions. And in this invention, the conventional groove cams for zooming control that require very high accuracy to manufacture are not used, but instead only the simple mechanism of the second lens operation is used, and as the result the whole zoom lens mechanism of this invention is much simpler, less expensive and easier to assemble than that of the conventional zoom lenses for DSCs.

Although the present invention has been fully described by way of the preferred embodiments thereof with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A zoom lens to be used for digital still cameras comprising:

a whole lens assembly including a first lens or a first lens group assembled and fixed at the headmost position of said whole lens assembly; a second lens or a second lens group assembled in a separate inner lens barrel, and in said whole lens assembly positioned next to said first lens or said first lens group as a movable lens or lens group in said whole lens assembly; and a third lens or a third lens group assembled and fixed at the rearmost position in said whole lens assembly; and a means of supporting and operating said second lens or said second lens group to move said second lens or said second lens group between said first and said third lenses or said first and said third lens groups so that the focal length of said zoom lens can be changed from the shortest focal length to the longest focal length and vice versa;

wherein during the operation of said means of supporting and operating said second lens or second lens group, the movement of said means of supporting and operating said second lens or said second lens group is assisted by tension of a spring such as an omega-shaped spring so that the speed of the movement can be increased and the movement cannot be stopped at midpoints of traveling of said second lens or lens group.

2. A zoom lens to be used for digital still cameras comprising:

a whole lens assembly including a first lens or a first lens group assembled and fixed at the headmost position of said whole lens assembly; a second lens or a second lens group assembled in a separate inner lens barrel, and in said whole lens assembly positioned next to said first lens or said first lens group as a movable lens or lens group in said whole lens assembly; and a third lens or a third lens group assembled and fixed at the rearmost position in said whole lens assembly; and a means of supporting and operating said second lens or said second lens group to move said second lens or said second lens group between said first and said third lenses or said first and said third lens groups so that the focal length of said zoom lens can be changed from the shortest focal length to the longest focal length and vice versa;

wherein during the operation of said means of supporting and operating said second lens or second lens group of, the movement of said means of supporting and operating said second lens or said second lens group is assisted by power of an electric device such as a shutter meter or a kind of motor so that the speed of the movement can be increased and the movement cannot be stopped at midpoints of traveling of said second lens or lens group.

* * * * *